United States Patent [19]
Sylvester

[11] 3,812,974
[45] May 28, 1974

[54] GREEN TIRE SUPPORT
[76] Inventor: Rowland L. Sylvester, 718 S. Chapin St., South Bend, Ind. 46621
[22] Filed: Oct. 6, 1972
[21] Appl. No.: 295,702

[52] U.S. Cl. ............................................. 221/23
[51] Int. Cl. ............................................. A47f 7/04
[58] Field of Search ............ 211/23, 20, 24, 19, 21, 211/170, 168, 60 R, 116, 44; 248/119 R; 214/334; 221/256

[56] References Cited
UNITED STATES PATENTS
2,776,063  1/1957  Larson .............................. 214/334
2,782,076  2/1957  Miller ............................. 214/334 X
3,288,411  11/1966  Davidson ........................ 248/119 R
3,322,286  5/1967  Sylvester ............................. 211/24

Primary Examiner—Ramon S. Britts
Attorney, Agent, or Firm—Oltsch & Knoblock

[57] ABSTRACT

A green tire support which includes a flexible web supported by and having a longitudinal dimension exceeding the spacing between carrier parts. One of the carrier parts includes a pivoted lever which is shiftable between a first position in which the web is formed into a generally U-shaped tire supporting sling and a second position in which the web is formed into a generally L-shaped configuration.

8 Claims, 7 Drawing Figures

PATENTED MAY 28 1974
3,812,974
SHEET 3 OF 3
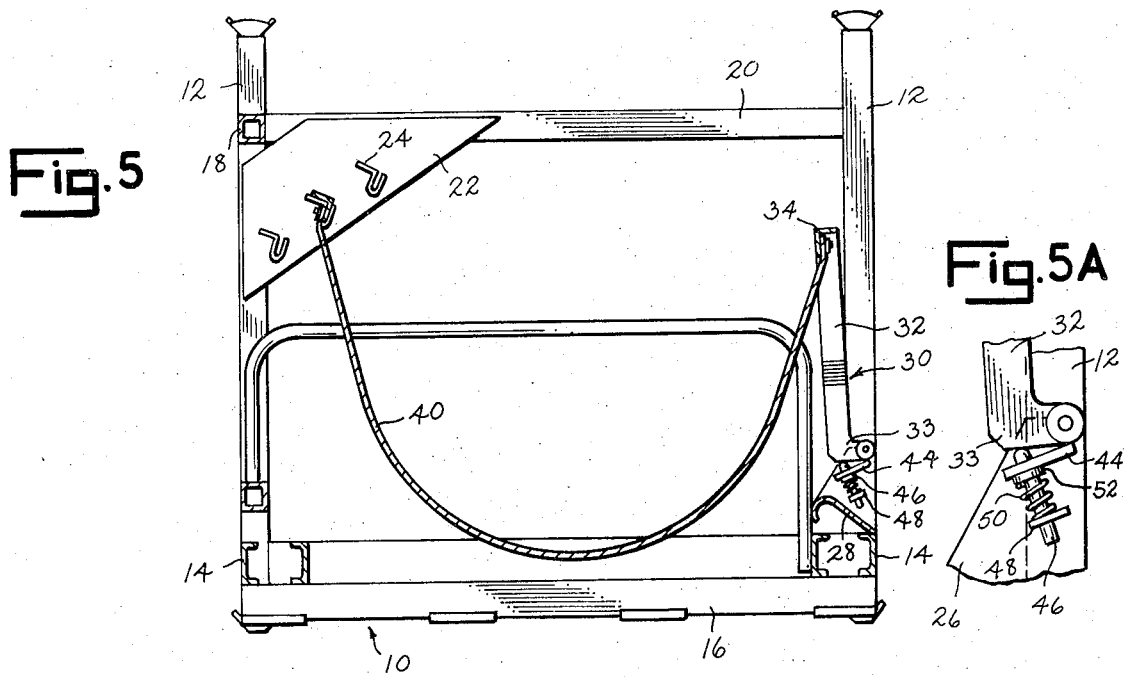
Fig.5
Fig.5A
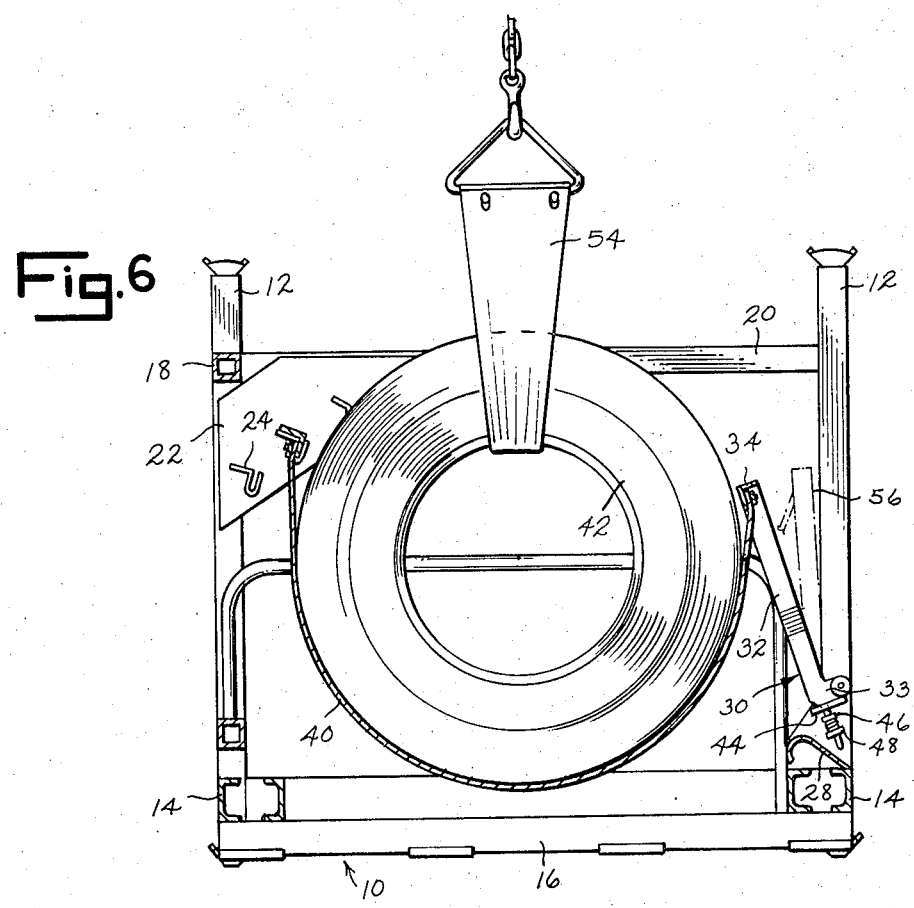
Fig.6

GREEN TIRE SUPPORT

SUMMARY OF THE INVENTION

This invention relates to a green tire support device which will have application in the manufacture of radial vehicle tires.

In the manufacture of vehicle tires it is customary to assemble the tire in an uncured state and to support and transport the assembled uncured tire, which generally includes reinforcing material, to a specific location where the manufacture of the tire is completed by curing or vulcanizing the rubber of the tire. The uncured tire, which may be assembled for vulcanizing in one or more steps, is known in the trade as a "green tire." Such green tires, by reason of their uncured nature, are sensitive to distortion during handling and transportation.

This invention, which is an improvement upon the green tire truck or support shown and described in U. S. Pat. No. 3,322,286, is utilized to support one or more green tires during the assembly process and prior to curing or vulcanizing in a manner which minimizes distortion of the tires and yet allows for ease of handling of the tires. This improved green tire support includes a frame having a base which supports spaced carrier parts. One or more flexible webs are supported by the carrier parts, with each web having a longitudinal dimension exceeding the spacing between the parts. One of the carrier parts associated with each web includes a pivoted lever or frame member which is shiftable toward the opposite carrier part into a first position and away from the carrier part into a second position. When each lever member is in its first position, the web supported thereby forms a generally U-shaped tire supporting sling which makes extensive circumferential contact with a green tire as it is carried within the sling. When the lever member is shifted from its first into its second position, the tire carried by the associated web is shifted slightly upwardly with the web forming a generally L-shaped configuration to facilitate removal of the tire from the sling. In some constructions of the green tire support of this invention support means are associated with the lever members so as to position the lever members in a generally upright orientation. This allows the tires to be lowered vertically onto the web, at which time the support means yield so as to permit the lever members to swing into their first positions and the webs to provide circumferential support for the tires.

Accordingly, it is an object of this invention to provide a device for supporting green tires.

Another object of this invention is to provide a green radial tire supporting device which minimizes distortion of the tire during storage and transportation.

Another object of this invention is to provide a green tire support device for radial truck tires.

Still another object of this invention is to provide a green tire support which is of simple operation and which can be utilized to handle tires of various sizes.

Other objects of this invention will become apparent upon a reading of the invention's description.

BRIEF DESCRIPTION OF THE DRAWINGS

FIG. 5 is a cross sectional view of a modified construction of the tire support of this invention.

FIG. 5a is a fragmentary detailed view of a component part of the tire support of FIG. 5.

FIG. 6 is a cross sectional view of the tire support of FIG. 5 shown supporting a tire assembly having been lowered onto the support by an overhead hoist.

DESCRIPTION OF THE PREFERRED EMBODIMENTS

Figure 1:
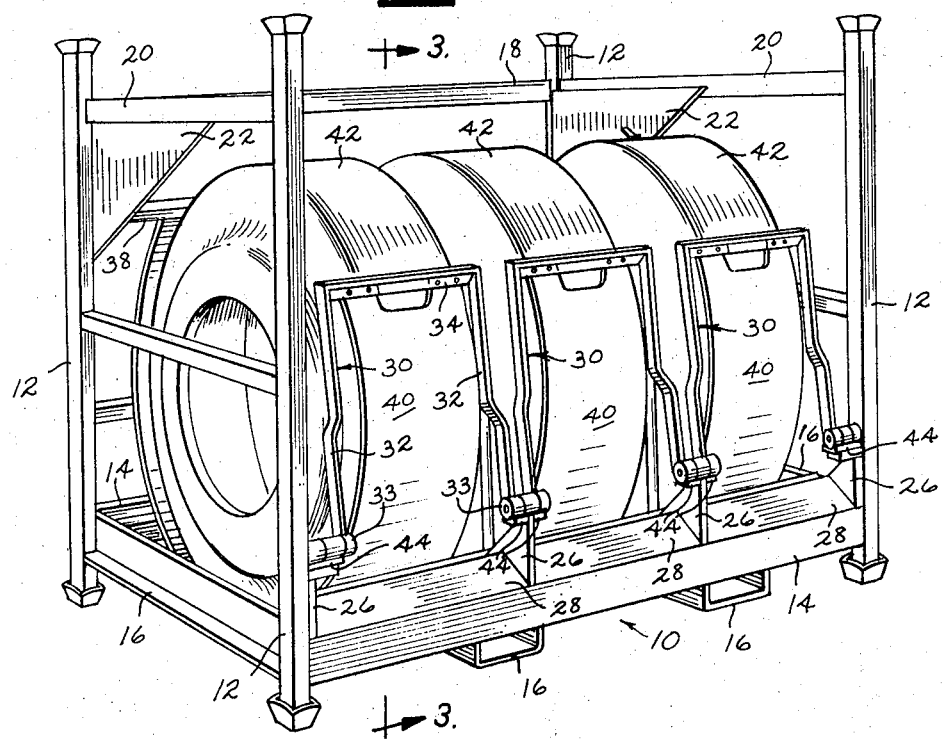
FIG. 1 is a perspective view of one embodiment of the green tire support of this invention shown supporting a plurality of tire assemblies.
Figure 2:
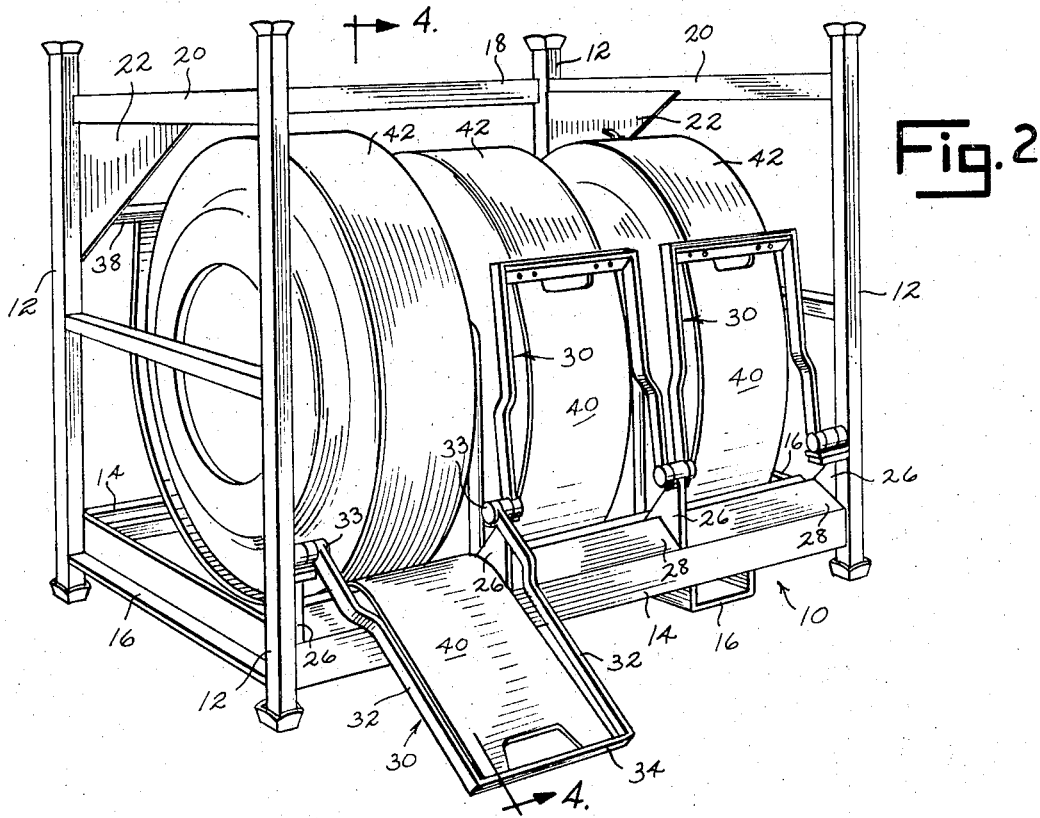
FIG. 2 is a perspective view of the green tire support of FIG. 1 shown in an operating position to allow for the removal of one of the tire assemblies.

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

The embodiment of this invention illustrated in FIGS. 1-4 includes a base 10 supported by corner-defining uprights 12. Base 10 includes longitudinal frame parts 14, extending between uprights 12, and transverse frame parts 16 extending between the longitudinal frame parts. Uprights 12 protrude below base 10 and are adapted for ground engagement. The upper portions of uprights 12 are connected by a side brace 18 and by end braces 20 and are adapted to support the lower ends of an upright of another similarly constructed tire support when the supports are stacked one upon the other.

A gusset plate 22 extends between brace 20 and one of the adjacent uprights 12 at each end of the tire support. Gusset plates 22 are oppositely located at one side of the support. The inner face of each gusset plate 22 carries a plurality of spaced hook parts 24 whose function will be later explained.

A plurality of vertically oriented, longitudinally spaced mounting plates 26 are welded or otherwise secured to the top of the longitudinal frame part 14 of base 10 on the opposite side of the support from gusset plates 22. A rounded, inclined ramp part 28 is positioned between each adjacent pair of mounting plates 26 and is welded to the plates and supporting frame part 14. An inverted U-shaped lever or frame 30 is pivotally secured between each adjacent pair of mounting plates 26. Each lever 30 includes legs 32 which are pivotally connected at ends 33 to the mounting plates 26 and which are joined at the other ends by a cross member 34.

Figure 3:
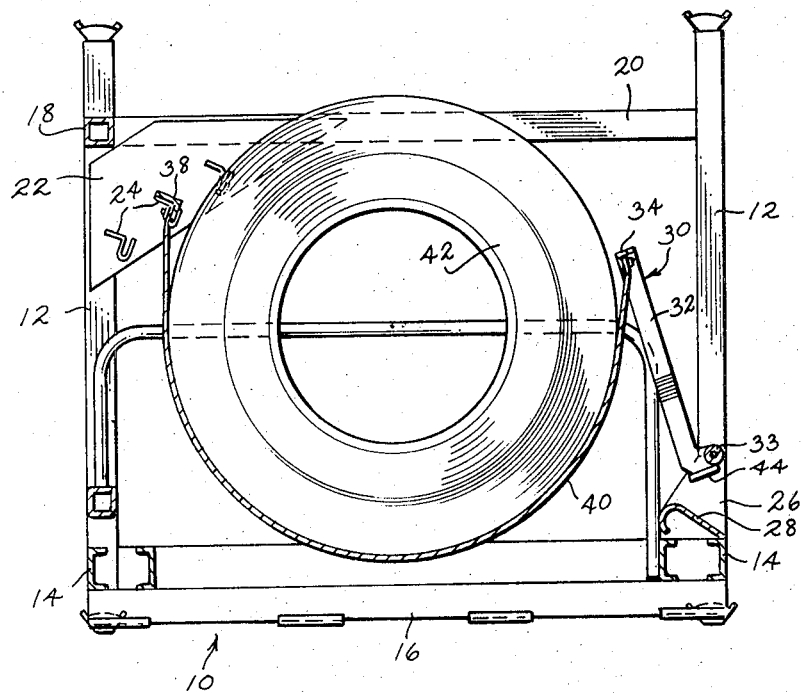
FIG. 3 is a cross sectional view taken along line 3—3 of FIG. 1.

A bar or rod 38 extends longitudinally relative to base 10 and is supported at its opposite ends in a spaced relationship from the base by hook parts 24. A flexible web member 40 is supported between rod 38 and cross member 34 of each lever 30. Each web member 40 has one end fixedly connected to rod 38 and its opposite end fixedly connected to the cross member 34 of a lever 30. The length of each web member 40 exceeds the spacing between rod 38 and attached lever 30 so as to form a sling, as best shown in FIG. 3, which is designed to make circumferential supporting contact with a green tire 42. A stop 44 in the form of a plate is secured to each mounting plate 26 and is positioned adjacent the pivot connection of a lever 30 so as to contact and support the lever in a slightly inwardly inclined position in which tire 42 is supported by web member 40, as best shown in FIG. 3. It will be observed that by having lever 30 inwardly inclined when supporting a tire 42, web member 40 makes peripheral supporting contact with a large portion of the tire, thus substantially eliminating distortion of the supported tire. It is to be further noted that stops 44 cause each lever 30 to be located, when supporting a tire 42, in an over-center position with the lever being firmly held against the stops by the weight of the tire.

Figure 4:
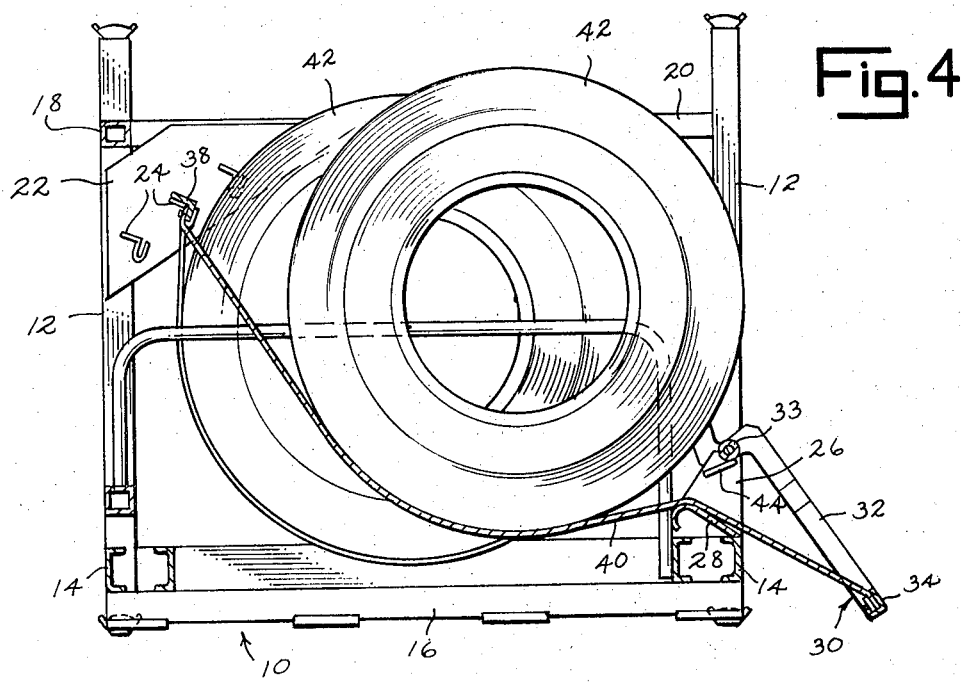
FIG. 4 is a cross sectional view taken along line 4—4 of FIG. 2.

When it is desired to load and remove tires 42, levers 30 are grasped by the user of the tire support and pivoted outwardly and downwardly, causing web members 40 to form a generally L-shaped configuration and to be stretched over ramp parts 28. Levers 30 will remain in their lowered position due to the upwardly offset relationship of the pivot axes of the levers relative to the connection of the web members 40 to the levers. With one or more selected levers 30 in their lowered positions, the tires can be grasped by the user of the tire support and rolled out of or into the support and over ramp parts 28. It will be noted as seen in FIG. 4 that as each lever 30 is lowered, the tire supported by the lever associated web member is slightly raised to facilitate removal of the tire from the support. Once a tire 42 has been loaded into the support and rests upon the generally L-shaped web member 40 with its connected lever 30 in its lowered position, the lever is grasped by the user and raised into its over-center position, as illustrated in FIG. 3, to cause the tire to be cradled by the web member.

The embodiment of the green tire support above described has been modified in FIGS. 5–6 to accommodate loading of the support by means of an overhead hoist or crane. This type of modification would have special application to truck tires which range from four to six feet in outer diameter and weigh up to 300 pounds. The tire support illustrated in FIGS. 5–6 is similar in construction to the support described in FIGS. 1–4 except that each stop 44 has a spring loaded plunger 46 which has one end extending upwardly through the stop into abutting engagement with lower end 33 of each lever leg 32. A bracket 48 is secured to each mounting plate 26 below the stop 44. Plunger 46 extends shiftably through bracket 48 and is forced into engagement with end 33 of lever leg 32 by means of a coil spring 50 which surrounds the plunger and which has one end abutting bracket 48 and its opposite end abutting a collar 52 forming a part of the plunger. Springs 50 are of sufficient strength to urge the lever 30 into a generally upright position, as illustrated in FIG. 5.

A tire 42 which is supported by a sling 54 carried upon an overhead hoist or crane is lowered to the side of side brace 18 of the support and into contact with a web member 40. As the tire contacts web member 40, the weight of the tire will cause the lever 30 which supports the web member to be pivoted from the broken line position 56 into the solid line position shown in FIG. 6, thereby depressing plunger 46. With plunger 46 so depressed, the lever 30 will rest upon stops 44 and support the sling-defining web member 40. Tire 42 may be removed from this modified embodiment of the green tire support either by grasping lever 30 and pivoting the lever into its lowered position shown in FIGS. 2 and 4, or, alternatively, by using sling 54 to lift the tire from the support. When utilizing a hoist or similar device to lift tire 42 from the tire support, it will be apparent that once the weight of the tire is removed from its supporting web member 40 plunger 46 will urge lever 30 into its generally upright or broken line position 56 shown in FIG. 6, thus allowing the tire to be removed without contacting the lever. In this manner plungers 46 serve as means to position levers 30 so that they will not contact or interfere with the lowering or raising of the tires into and out of the tire support To adjust the curvature or sag of web member 40 for the purpose of accommodating tires of various sizes, rod 38 can be optionally positioned in one of a plurality of pairs of opposing hook parts 24 which are connected to gusset plates 22. If desired, casters or other type wheel means can be connected to base 10 of the support to allow the support to be moved from one location to another. Additionally, a hitch or similar coupler can be connected to base 10 and utilized in conjunction with wheel means to tow the support. Levers 30 provide a means for raising and lowering the tire as each arm is swung by the user of the support and serve to minimize the amount of effort required to elevate and position the tires for removal from the support. Additionally, each lever 30 acts as an over-center support which in conjunction with web member 40 serves to provide maximum cradling support of the tire. Instead of one rod 38 for supporting web members 40, a rigid support for each web member could be provided.

It is to be understood that the invention is not to be limited to the details herein given but that it may be modified within the scope of the appended claims.

What I claim is:

1. A green tire support comprising a frame having a base supporting spaced carrier means, a flexible web supported by and having a longitudinal dimension exceeding the spacing between said carrier means, one of said carrier means including a hand actuated lever member, means pivotally connecting one end of said lever member to said frame wherein said lever member is shiftable about a horizontal pivot axis toward the other of said carrier means into a first position and away from said other carrier means into a second position, means anchoring one end margin of said web to said lever member spaced from its pivot axis, means anchoring the other end margin of said web to the other carrier means, said web having a tire-supporting profile of a generally U-shaped configuration when said lever member is in its first position and a generally L-shaped configuration when said lever is in its second position, and means aligned with said web for contacting said web intermediate the end margins thereof when said lever member is in its second position to raise said web profile to assist in the removal of a tire being supported by said web from said carrier.

2. The support of claim 1 and stop means engagable by said lever member for positioning said lever member in its first position.

3. The support of claim 1 wherein at least one of said anchor means adjustably anchors a web end margin to a said carrier means wherein the curvature of said web can be varied to accommodate tires of various sizes with said lever member in its first position.

4. The support of claim 3 wherein the anchor means associated with said other web end margin adjustably anchors the web to said other carrier means.

5. The support of claim 1 wherein said frame base includes a ramp means constituting said web contacting means and positioned under said lever member.

6. The support of claim 1 and support means in contact with said lever means for urging said lever member into a generally upright position, said support means being yieldable when a tire is set upon said web with said lever arm in said generally upright position to permit said lever arm to shift from said generally upright position into its said first position.

7. A green tire support comprising a frame having a base supporting spaced carrier means, a flexible web supported by and having a longitudinal dimension exceeding the spacing between said carrier means, one of said carrier means including a pivoted lever member shiftable about a pivot axis toward the other of said carrier means into a first position and away from said other of said carrier means into a second position, means anchoring one end margin of said web to said lever member spaced from its pivot axis, means anchoring the other end margin of said web to the other carrier member, said web defining a generally U-shaped tire supporting sling when said lever member is in its first position, support means in contact with said lever member urging said lever member into its second position wherein said web defines a sling which is more open than said first mentioned sling, said support means being yieldable when a tire is set upon said web with said lever member in its second position so as to permit said lever member to shift from its said second position into its said first position.

8. The support of claim 1 and stop means engageable by said lever member for positioning said lever member in an over-center orientation inclined toward said other carrier means when said lever member is in its first position.

* * * * *